(12) United States Patent
Ritz et al.

(10) Patent No.: US 7,844,865 B2
(45) Date of Patent: Nov. 30, 2010

(54) BUS MODULE FOR CONNECTION TO A BUS SYSTEM AND USE OF SUCH A BUS MODULE IN AN AS-I BUS SYSTEM

(75) Inventors: Gudrun Ritz, Erlangen (DE); Peter Weichhold, Rosstal (DE); Jürgen Wolski, Henfenfeld (DE)

(73) Assignee: Siemens Aktiengesellschaft, Munich (DE)

( * ) Notice: Subject to any disclaimer, the term of this patent is extended or adjusted under 35 U.S.C. 154(b) by 380 days.

(21) Appl. No.: 12/085,269

(22) PCT Filed: Nov. 17, 2006

(86) PCT No.: PCT/EP2006/068623

§ 371 (c)(1),
(2), (4) Date: May 20, 2008

(87) PCT Pub. No.: WO2007/057445

PCT Pub. Date: May 24, 2007

(65) Prior Publication Data

US 2009/0055561 A1  Feb. 26, 2009

(30) Foreign Application Priority Data

Nov. 21, 2005  (DE)  .................. 10 2005 055 428

(51) Int. Cl.
G06F 11/00  (2006.01)

(52) U.S. Cl. ...................................... 714/52

(58) Field of Classification Search .................. 714/52, 714/50, 21, 822; 713/400, 401, 500, 501, 713/502, 503, 600, 601; 700/9, 79
See application file for complete search history.

(56) References Cited

U.S. PATENT DOCUMENTS

| 4,245,346 | A  | * | 1/1981 | Grady et al. ................... 380/31 |
| 4,791,642 | A  | * | 12/1988 | Taylor et al. ................. 714/764 |
| 6,505,321 | B1 |   | 1/2003 | MacLellan et al. |
| 6,543,012 | B1 | * | 4/2003 | Viswanathan et al. ......... 714/50 |
| 7,372,916 | B2 | * | 5/2008 | Pappalardo et al. ......... 375/295 |
| 7,557,739 | B1 | * | 7/2009 | Ni .............................. 341/58 |
| 7,583,580 | B2 | * | 9/2009 | Saito et al. ............. 369/112.23 |
| 7,620,118 | B2 | * | 11/2009 | Choi .......................... 375/301 |
| 2005/0049722 | A1 | * | 3/2005 | Kobayashi .................... 700/9 |
| 2006/0028976 | A1 | * | 2/2006 | Park et al. .................... 370/203 |
| 2006/0136801 | A1 | * | 6/2006 | Hickey et al. ................ 714/781 |

* cited by examiner

*Primary Examiner*—Robert Beausoliel
*Assistant Examiner*—Amine Riad

(57) ABSTRACT

Disclosed is a bus module that can be connected to a bus system and comprises means for outputting safety-relevant signals in the form of repeated unambiguous code sequences. The bus module further comprises a first and second arithmetic unit with means for executing software programs. A code generator program of the first arithmetic unit generates a first partial code sequence of the code sequence while a code generator program of the second arithmetic unit generates the remaining portion of the code sequence as a second partial code sequence. Advantageously, a proper code sequence is output at the output of the bus module only when both arithmetic units function properly. A deviation in the code sequence that is output can then be detected by a monitor or actuator.

18 Claims, 3 Drawing Sheets

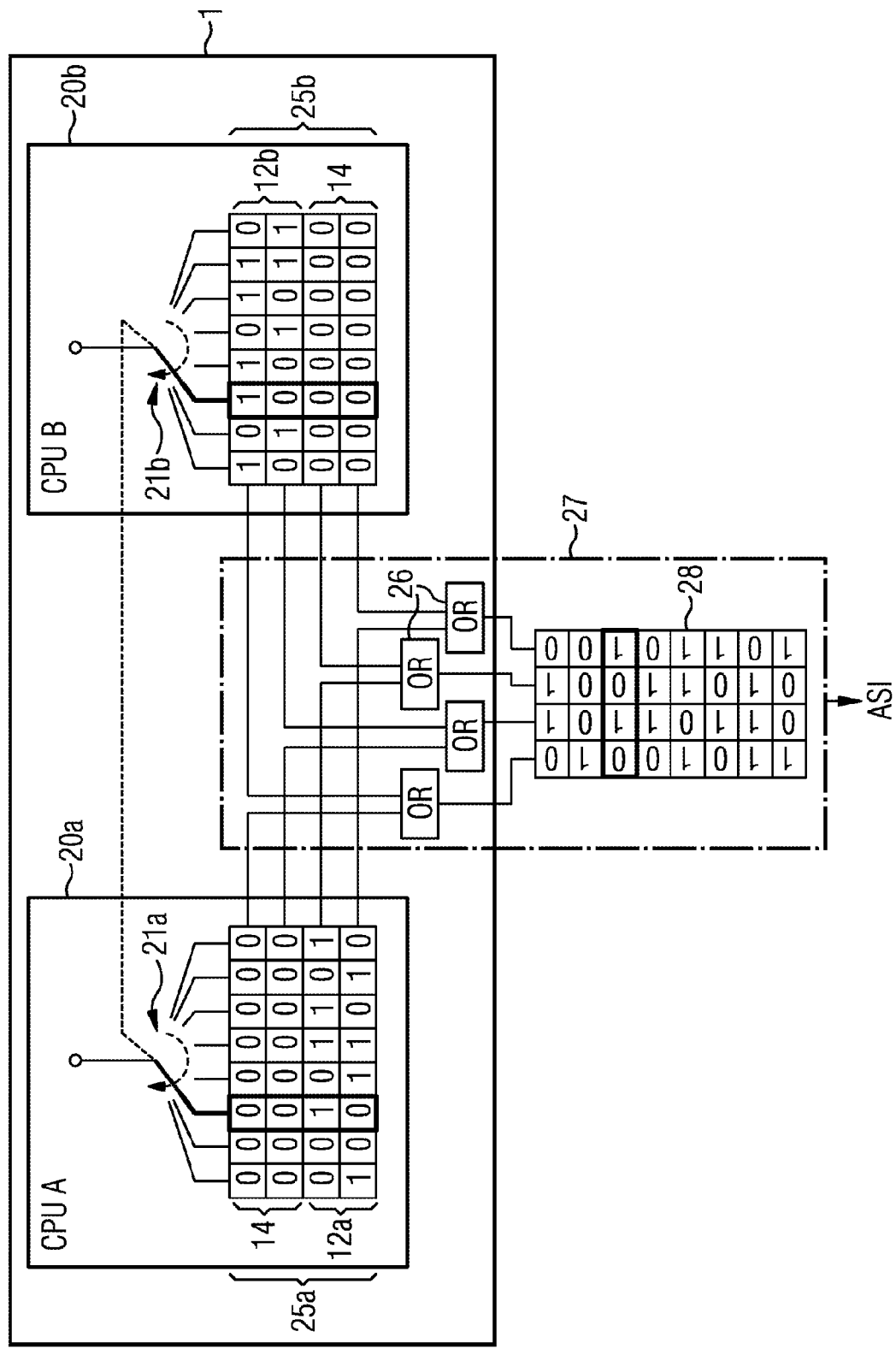

BUS MODULE FOR CONNECTION TO A BUS SYSTEM AND USE OF SUCH A BUS MODULE IN AN AS-I BUS SYSTEM

CROSS REFERENCE TO RELATED APPLICATIONS

This application is the US National Stage of International Application No. PCT/EP2006/068623, filed Nov. 17, 2006 and claims the benefit thereof. The International Application claims the benefits of German application No. 10 2005 055 428.8 DE filed Nov. 21, 2005, both of the applications are incorporated by reference herein in their entirety.

FIELD OF INVENTION

The invention relates to a bus module for connection to a bus system, wherein said bus module features means for outputting safety-relevant signals in the form of repeated unambiguous code sequences. The invention additionally relates to the use of such a bus module in an AS-i system.

BACKGROUND OF INVENTION

Such bus modules can be connected e.g. to an AS-i bus system in accordance with the EN 50295 standard or in accordance with the IEC 62026-2 standard which is awaiting publication. The AS-i (Actuator Sensor interface) bus system is a field bus which uses an unshielded 2-conductor flat cable for the shared transmission of electrical energy and data. The maximal cable length is approximately 100 m in this case, wherein the cable length can be extended by means of repeaters. Furthermore, any network topology of the bus system is permitted, e.g. a tree structure.

Up to 31 or 62 slaves can be connected to a master via a bus system of the above cited type. The slave establishes a data connection to a sensor or an actuator, and the master establishes a data connection to a host system which consists of e.g. an SPC (Stored Programmable Control), a PC (Personal Computer) or a coupler to a superordinate field bus system. The functionality of the slave is preferably completely integrated in the sensor or the actuator.

As part of the data transmission, a safety-relevant signal is transmitted in the form of a repeated unambiguous code sequence, wherein each signal is checked more than once for transmission errors. In the event of an error, the code sequence of the signal is automatically repeated, wherein this erroneous code sequence must then be followed by at least nine correct code sequences.

The AS-i bus system is designed in particular for binary and analog devices belonging to the underlying automation level. Such devices are e.g. components related to work safety such as emergency off switches, door contact switches, light shutters, tread mats, barriers, etc. The signals from such safety sensors are monitored by a monitor which can set machines or the installations into a safe state by means of corresponding switch outputs.

The bus modules such as slave, master, monitor or power supply can be connected at any desired position of the bus system. The bus system can be expanded, is easy to install and is considerably less expensive to purchase in comparison with more complex bus systems such as Profibus or CAN-Bus.

A bus module having the functionality of a slave can generate safety-relevant signals e.g. by means of internal operational logic. However, the signals can also be read in from a superordinate bus system or from a connected back-panel bus. Such a safety-relevant signal can be generated e.g. from an OR operation from a tread mat signal and from a light shutter signal. The signal is cyclically polled by the master and then routed to the actuator that is addressed in each case.

A safety-relevant signal is output onto the bus system as a repeated code sequence with an unambiguous encoding. If the signal is active and identified for output for an actuator, seven encodings are cyclically generated according to the above cited standards, wherein a current encoding differs from a preceding encoding. Seven 4-bit encodings are cyclically output for an actuator, wherein an encoding comprising four logical "0" values or four "1" values alone is not generated. Instead of the binary value designation "0" or "1" for a logical state, the value designation "L" or "H" is also common. On the receiver side, i.e. on the side of the actuator, this 7×4-bit code sequence is compared internally with a code sequence which is formed in the same way. In the event of an error, i.e. if a variation is detected, the actuator resets its switch output. A bus module can therefore reset the switch state of an actuator by changing or interrupting the code sequence. In the case of the present example, the safety-relevant signal is dropped e.g. if the tread mat is stepped on. The addressed actuator detects a variation between the received sequence and the internally generated comparison sequence and changes the switch state at the output accordingly. This can result in a warning light signal being switched on, for example.

In accordance with the above cited standards, eight repeated encodings are used instead of seven repeated encodings if a monitor is being addressed. In the event of an error, or if a safety-relevant signal is dropped by the bus module, the monitor changes its switch status accordingly. In this way, it is possible to disconnect e.g. the energy supply of the machine that is to be monitored or of the installation.

Until now, the output of the safety-relevant signals has been coordinated by means of a computer unit on which secure software is executed. Safety devices or safety controllers usually require a special authorization by relevant regulatory authorities before use, e.g. by the TÜV or by the trade associations in Germany. In this case, the safety device must comply with prescribed safety standards, e.g. as laid down in the European standard EN 954-1, and satisfy at least the safety category 3 of the cited European standard.

Disadvantages of this include the extremely demanding requirements relating to the internal error protection of a device and the associated time and development costs for the approval or certification of safety-related software on such a device. When developing the safety-related software, it must be ensured in particular that the output code sequence is at least changed securely in the event of any possible failure of the computer unit, such that the actuator or the monitor can detect the erroneous code sequence in the next cycle or at the latest in the cycle after that. It is therefore entirely conceivable that, if the computer unit crashes, the processor remains in a loop such that the code sequence continues to be output in a cyclical manner.

SUMMARY OF INVENTION

In one aspect the invention therefore addresses the problem of specifying a bus module whereby an above cited disadvantages may be avoided.

A further object of the invention is to specify a suitable use of such a bus module.

This object is achieved by a bus module for connection to a bus system in accordance with an independent claim. Further advantageous embodiments are specified in the dependent claims. A suitable use of such a bus system is also described.

According to the invention, the bus module features a first and a second computer unit with means for executing software programs, wherein a code generator program of the first computer unit generates a first partial code sequence of the code sequence and a code generator program of the second computer unit generates a remaining part of the code sequence as a second partial code sequence.

The great advantage of the invention is that a correct code sequence is only output at the output of the bus module if both computer units are functioning correctly. If one of the computer units then fails, the partial code sequence changes. The complete code sequence also changes as a result of this, and its variation can then be detected by the monitor or by the actuator.

Moreover, it is advantageous that a lower safety category is required for the safety-related software which is executed on the relevant computer unit, in particular for the code generator program. As a result of this, the certification or approval procedure is simplified and significantly accelerated. In addition, the development cost for such safety-related software is clearly reduced.

If the two code generator programs exclusively generate encodings of the respective individual partial code sequences, the respective complementary i.e. remaining part of the complete code sequence cannot be "guessed" by the other computer unit, since the encoding of the respective other partial code sequence is not part of the relevant code generator program. In the case of 4-bit wide encodings, it is only possible to store, e.g. in a memory area of a computer unit, those relevant 2-bit wide encodings which are consecutively read in and then output by a processor of the relevant computer unit.

The two computer units are typically synchronized by means of a synchronization line, e.g. by means of a clock-pulse line, such that the two partial code sequences are output synchronously onto the bus system. For this purpose, the two computer units can feature an output register or an output port in each case, at which the electrical signals of the relevant partial code sequences can be picked up.

In particular, the code sequence features encodings which have a 4-bit wide value range and are repeated in particular after seven or eight encodings. Each encoding is different from a preceding encoding in this case. Consecutive identical encodings indicate an erroneous code sequence. This is often the case if a so-called "exception" is triggered due to a serious error when running a software program. In such cases, the further process processing is stopped by the computer unit.

According to the above cited standard, the code sequence only includes binary encodings with a maximum of three "0" values or three "1" values. This means that bit sequences of a relevant encoding bit of the code sequence with exclusively "0" values or "1" values are not permitted. These sequences would be output in particular in the event of the process processing being stopped.

In a preferred embodiment of the invention, the two code generator programs also each generate a release sequence which contains exclusively binary "0" and/or "1" values per encoding bit. The means for outputting the safety-relevant signals feature AND elements and/or OR elements for logical association of the encoding bits of the respective partial code sequences with the relevant corresponding encoding bits of the release sequences in order to form the code sequence.

The particular advantage is that if erroneous operation of the (local) computer unit is detected, the output of the partial code sequences of the other computer unit can be prevented by means of changes to the values of the release sequences. If e.g. the one input of the AND element is connected to the corresponding output port of an encoding bit of the partial code sequence of the one computer unit, this signal passes through the AND element unchanged if a 1-bit wide release sequence containing "1" values from the other computer unit is present at the other input of the AND element. If the release sequence is now changed to values having a "0" value, only "0" values are then present at the output of the AND element. At the latest in the cycle after next, this code sequence is then recognized as erroneous on the receiver side. If e.g. the one input of the OR element is connected to the corresponding output port of an encoding bit of the partial code sequence of the one computer unit, this signal passes through the OR element unchanged if a 1-bit wide release sequence containing "0" values from the other computer unit is present at the other input of the AND element. If the release sequence is now changed to values having a "1" value, only "1" values are then present at the output of the OR element. At the latest in the cycle after next, this code sequence is then also recognized as erroneous on the receiver side.

In a preferred embodiment, the two computer units are connected via a data line for the exchange of synchronization data. The code generator program of the respective computer unit then generates a changed release sequence in the event of variations in the synchronization data.

The particular advantage of this is that one computer unit can monitor the other. This takes place on the basis of the mutually exchanged synchronization data. For this, both computer units preferably each use an algorithm to synchronously generate an identical and continuously changing synchronization data item which is then output to the other computer unit via the data line and compared there. If a computer unit now receives a probably erroneous synchronization data item via the data line, the computer unit blocks the output of the partial code sequences of the other computer unit by outputting changed release sequences.

During normal operation, the relevant partial code sequence can be changed by means of the code generator program in the case of a change of a signal that is to be output. This is the case e.g. if a secure signal which is generated by an internal operational logic, a secure signal which is read in from a superordinate bus system, or a secure signal which is read in from a connected back-panel bus is dropped. If an emergency-off button is pressed, for example, the associated secure signal "Emergency-off not pressed" is dropped.

In particular, the means for outputting the safety-relevant signal include means for converting the code sequence into a serial signal sequence. This means can be a parallel/serial converter, for example. Such converters are available as electronic integrated modules. The serial signal sequence can then be modulated onto the two conductors of the AS-i bus system by means of pulse code modulation, for example.

A bus system in accordance with the invention can be used in particular in a bus system which is based on the EN 50295 standard or the IEC 62026-2 standard. Such a bus system is suitable for transmitting safety-relevant signals in particular.

BRIEF DESCRIPTION OF THE DRAWINGS

Further advantageous characteristics of the invention are derived from their exemplary explanation with reference to the figures, in which:

FIG. 3 shows a further embodiment of the exemplary bus module as per FIG. 2.

DETAILED DESCRIPTION OF INVENTION

Figure 1:
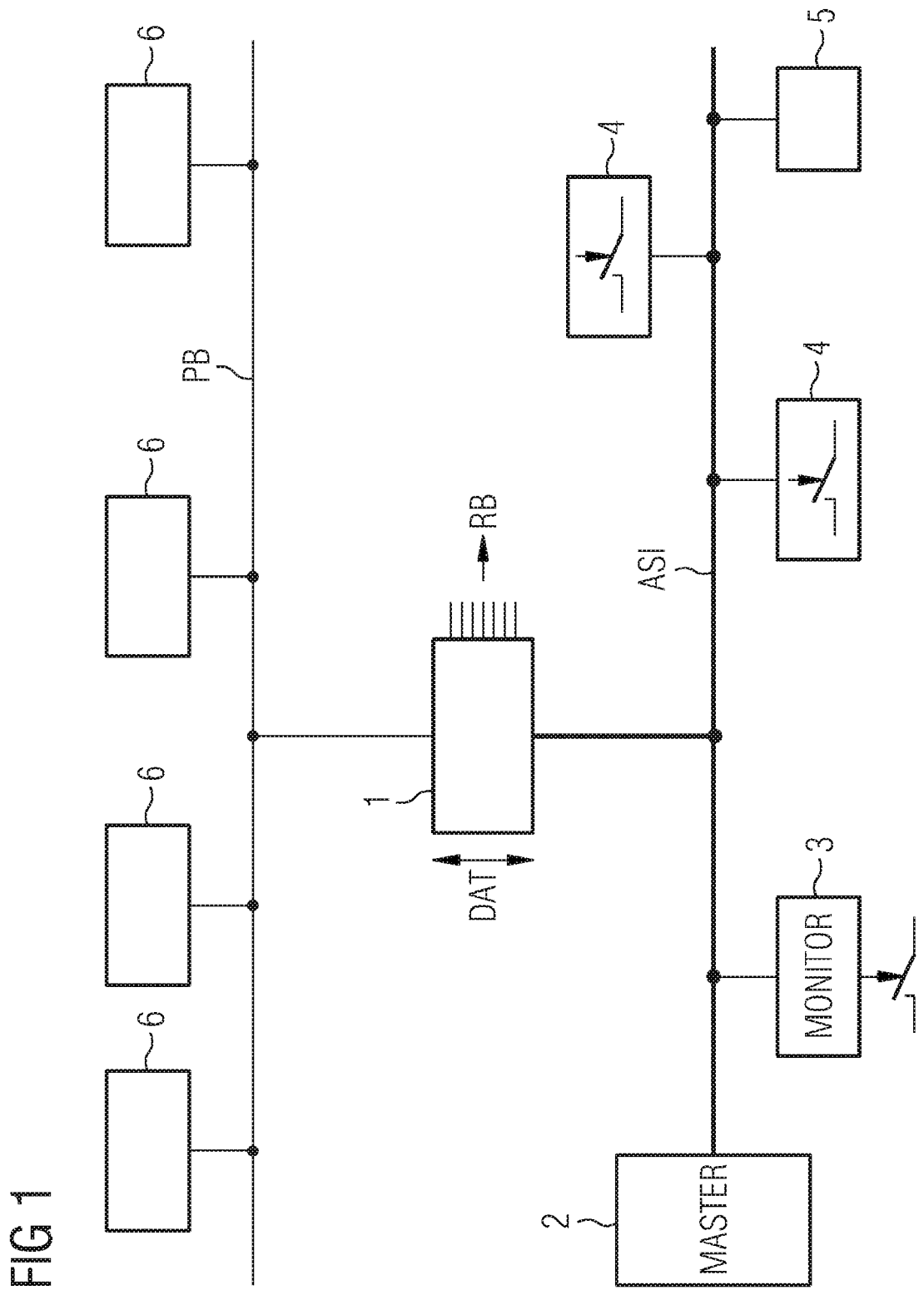
FIG. 1 shows an example of a bus module which provides a data connection between two bus systems.

FIG. 1 shows an example of a bus module 1 which provides a data connection between two bus systems ASI, PB. The upper part of FIG. 1 illustrates a Profibus PB as a bus system of the upper automation level by way of example, with four bus subscribers by way of example. A bus system ASI of the lower automation level is illustrated in the lower part of FIG. 1. Data DAT including safety-relevant information, e.g. safety-relevant signals, can be exchanged between these two bus systems ASI, PB. In the example according to FIG. 1, the bus module 1 functions as a so-called gateway or link module. The bus module 1 can generate individual safety-relevant signals by means of internal logic operations and output these onto the two bus systems. However, the bus module 1 can also read in further safety-relevant signals via a back-panel bus RB or output said signals onto the back-panel bus RB.

In the lower part of FIG. 1, an AS-i bus system as per the European EN 50295 standard or the IEC 62026-2 standard is illustrated by way of example. Six bus modules are connected to this bus system ASI by way of example. In the left-hand part of FIG. 1, a master 2 is illustrated which sends addressed messages and receives the reply from the addressed slaves 1, 4 directly. The master 2 monitors the slaves 1, 4 continuously by polling them cyclically using a cycle time of less than 5 ms. In this case, the cycle time is automatically adapted to the number of connected slaves 1, 4. The cycle time is thus approximately 1 ms in the case of six slaves 1, 4, and approximately 5 ms in the case of 31 slaves 1, 4. In the example of FIG. 1, the bus module 1 which is designed as a gateway also functions as a slave. Actuators are represented using the reference sign 4 and have the functionality of a slave for outputting in particular binary signals for detectors, signal pillars, control relays, etc.

The reference sign 3 represents an AS-i safety monitor which monitors the signals from the safety-relevant components and disconnects the installation in accordance with the defined stop category. Complex protection routines such as emergency stop, two-handed operation, door tumbler or on-site confirmation can be implemented by means of the monitor 3. The reference sign 5 designates an AS-i power supply which consists of two functions, specifically a conventional power supply and a data decoupler in order to avoid a signal-related short circuit across the power supply of the data that is modulated onto the operating voltage. The power supply generally provides a voltage in the range from 24 V to 30 V.

Figure 2:
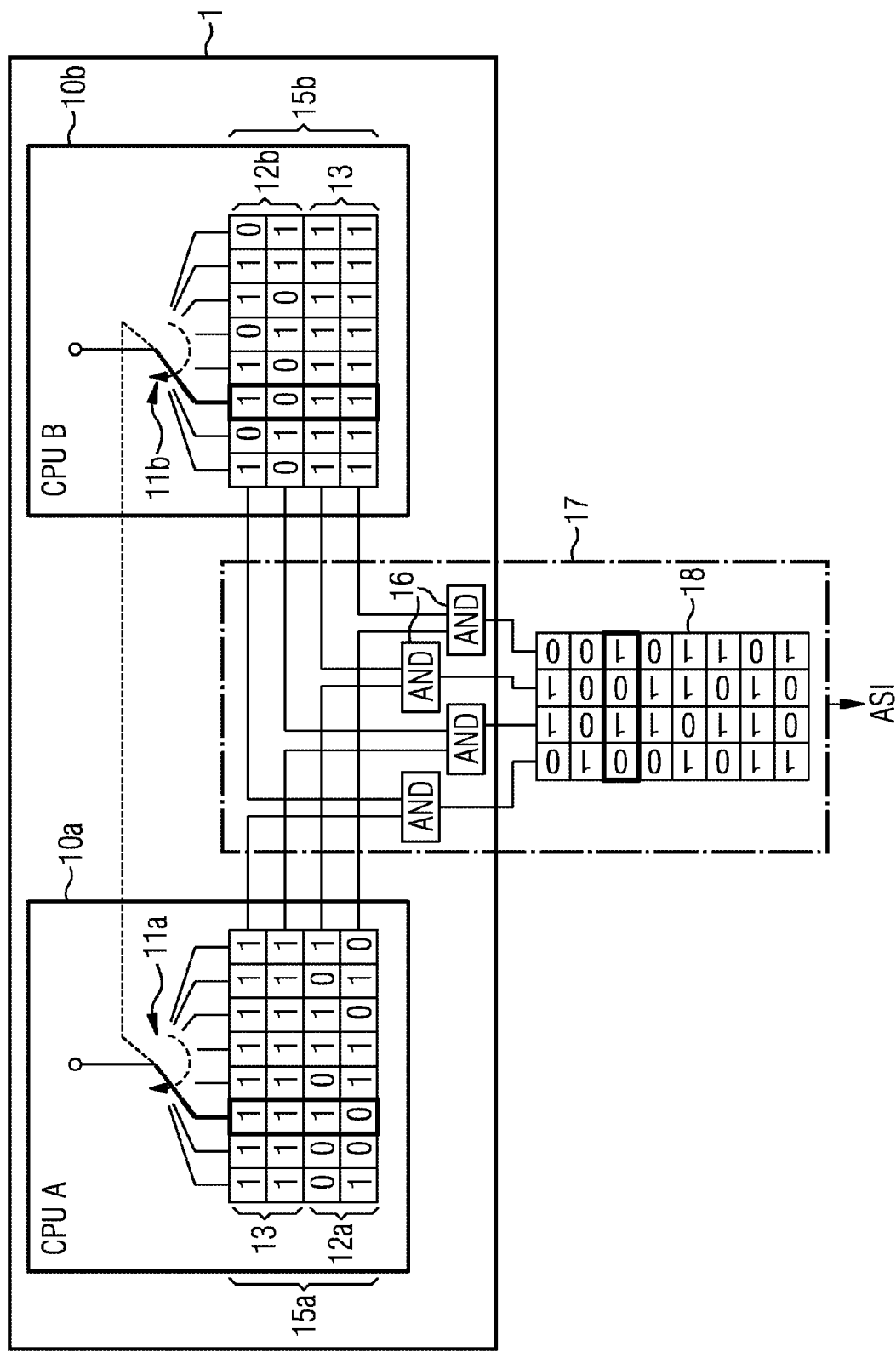
FIG. 2 shows an exemplary structure of a bus module comprising two computer units for jointly generating a code sequence in accordance with the invention and comprising means for outputting the code sequence in accordance with an embodiment of the invention.

FIG. 2 shows an exemplary structure of a bus module 1 comprising two computer units 10a, 10b for jointly generating a code sequence 18 and means for outputting 17 the code sequence 18 in accordance with an embodiment of the invention. During normal operation, the two computer units 10a, 10b generate the safety-relevant signal in parallel and forward said signal via the means for output 17 to the bus system ASI.

According to the invention, the computer units 10a, 10b feature means for executing software programs, in particular a multiplicity of software routines. In this case, the code generator program 11a of the first computer unit 10a generates a first partial code sequence 12a of the code sequence 18 and a code generator program 11b of the second computer unit 10b generates the remaining part of the code sequence 18 as a second partial code sequence 12b. The output of the safety-relevant signals in the form of repeated unambiguous code sequences 18 is symbolized by a switch with a multiplicity of switch settings. The broken line which connects the two "switches" indicates the synchronous relaying and hence the synchronous output of the partial code sequences 12a, 12b that are generated. The partial code sequences 12a, 12b which are generated according to the example in FIG. 2 feature a 2-bit wide encoding. The two 2-bit wide partial code sequences 12a, 12b produce the 4-bit wide code sequence 18 via the means for output 17. For the purposes of the invention, a microprocessor or a CPU (Central Processing Unit) is used for executing the relevant code generator programs 11a, 11b.

According to an exemplary embodiment of the invention, in addition to the respective partial code sequences 12a, 12b, the relevant code generator program 11a, 11b also generates a 2-bit wide release sequence 13 which features a logical "1" value for each encoding bit. The means for output 17 feature four AND elements 16, the signals of the code sequence 18 being present at the outputs thereof. In this case, one input of an AND element 16 has a signal connection in each case to one encoding bit of a release sequence 13, while the other input of an AND element 16 has a signal connection to the relevant encoding bit of the other partial code sequence 12a, 12b in each case. The four AND elements 16 can already be integrated as logic gates in an electronic component. Such a component is e.g. the integrated component or IC (Integrated Circuit) having the type designation 7408 of the well-known TTL 74 range of products.

In the example in FIG. 2, the two computer units 10a, 10b are connected via a data line for the exchange of synchronization data SD. The code generator program 11a, 11b of the relevant computer units 10a, 10b would now generate a different release sequence 13 in the event of variations in the synchronization data SD, i.e. for the purposes of this invention a sequence comprising exclusively "0" values instead of the "1" values. The consequently changed code sequence 18 can then be detected by a monitor bus module 3.

FIG. 3 shows a further embodiment of the exemplary bus module 1 as per FIG. 2. FIG. 3 differs from the example in the FIG. 2 in that OR elements 26 or OR gates are now used instead of AND elements 16, and release sequences 14 comprising "0" values are now used instead of release sequences 13 comprising "1" values.

The invention claimed is:

1. A bus module for connection to a bus system, comprising:
   an output for outputting safety-relevant signals in the form of repeated unambiguous code sequences;
   a first computing unit for executing a software program;
   a second computing unit for executing a software program;
   a first code generator program for the first computing unit, wherein the first code generator program generates a first partial code sequence of the code sequence; and
   a second code generator program for the second computing unit, wherein the second code generator program generates a remaining part of the code sequence as a second partial code sequence.

2. The bus module as claimed in claim 1, wherein the code generator programs exclusively generate encodings of the respective individual partial code sequences.

3. The bus module as claimed in claim 2, wherein the code sequence has encodings with a 4-bit wide value range.

4. The bus module as claimed in claim 3, wherein the code sequence is repeated after seven or eight encodings, and wherein each encoding is different from a preceding encoding.

5. The bus module as claimed in claim 3, wherein the code sequence only includes binary encodings with a maximum of three "0" values or three "1" values.

6. The bus module as claimed in claim 1, wherein the code sequence has encodings with a 4-bit wide value range.

7. The bus module as claimed in claim 6, wherein the code sequence is repeated after seven or eight encodings, and wherein each encoding is different from a preceding encoding.

8. The bus module as claimed in claim 6, wherein the code sequence only includes binary encodings with a maximum of three "0" values or three "1" values.

9. The bus module as claimed in claim 1, wherein the code generator programs each generate a release sequence which contains exclusively binary "0" and/or "1" values per encoding bit.

10. The bus module as claimed in claim 9, further comprising AND elements and/or OR elements for a logical association of the encoding bits of the respective partial code sequences with the relevant corresponding encoding bits of the release sequences for forming the code sequence.

11. The bus module as claimed in claim 10, wherein the two computer units are connected via a data line for the exchange of synchronization data, and wherein the code generator program of the respective computer unit generates a changed release sequence in the event of variations in the synchronization data.

12. The bus module as claimed in claim 11, wherein the code sequence is converted into a serial signal sequence.

13. The bus module as claimed in claim 1, wherein the relevant partial code sequence is changed by the code generator program in the case of a change of a signal that is to be output.

14. The bus module as claimed in claim 13, wherein the code sequence is converted into a serial signal sequence.

15. The bus module as claimed in claim 1, wherein the code sequence is converted into a serial signal sequence.

16. The bus module as claimed in claim 15, wherein the output has a parallel/serial converter to convert the code sequence into a serial signal sequence.

17. The bus module as claimed in claim 1, wherein the bus module is specified for a EN 50295 standard.

18. The bus module as claimed in claim 1, wherein the bus module is specified for a IEC 62026-2 standard.

* * * * *